United States Patent [19]
Derleth et al.

[11] 4,341,663
[45] Jul. 27, 1982

[54] PROCESS FOR THE PRODUCTION OF SPHERICAL SHAPED BODIES BASED ON $Al_2O_3$ AND OPTIONALLY $SiO_2$

[75] Inventors: Helmut Derleth; Karl-Heinz Bretz; Günther Saüer, all of Nienburg, Fed. Rep. of Germany

[73] Assignee: Kali-Chemie Aktiengesellschaft, Hannover, Fed. Rep. of Germany

[21] Appl. No.: 182,708

[22] Filed: Aug. 29, 1980

[30] Foreign Application Priority Data

Sep. 6, 1979 [DE] Fed. Rep. of Germany ....... 2935914

[51] Int. Cl.$^3$ ............................................. B01J 21/04
[52] U.S. Cl. .................................. 252/463; 264/118; 264/119; 264/142; 264/15
[58] Field of Search ................ 264/118, 119, 15, 142; 252/463

[56] References Cited

U.S. PATENT DOCUMENTS

| | | | |
|---|---|---|---|
| 2,307,878 | 1/1943 | Connolly | 252/455 R |
| 2,347,648 | 5/1944 | Thomas et al. | 252/455 R |
| 2,867,000 | 1/1959 | Huszar | 264/142 |
| 3,547,832 | 12/1970 | Hass et al. | 252/463 |
| 3,836,354 | 9/1974 | Wienert | 264/15 |
| 4,238,430 | 12/1980 | Phillips | 264/15 |

FOREIGN PATENT DOCUMENTS 615568 2/1961 Canada ................... 264/15

Primary Examiner—James R. Hall
Attorney, Agent, or Firm—Schwartz, Jeffery, Schwaab, Mack, Blumenthal & Koch

[57] ABSTRACT

A process for the preparation of shaped bodies includes preparing a plastic mixture of a material selected from the group consisting of aluminum oxides, aluminum hydroxides, silicon oxides, silicon hydroxides and mixtures thereof from a predominantly dry component K1 in powdered form and a paste component K2 comprising water and additional additives, continuously extruding the plastic mixture into cut lengths, shaping the cut lengths into spherical shaped bodies and drying the spherical shaped bodies and optionally tempering such bodies to form catalyst and catalyst supports. The solids content of the powdered component K1 is from 65 to 100% by weight whereas the solids content of the paste component K2 is 10 to 50% by weight. Preferable spherical shaped bodies are based on $Al_2O_3$, $SiO_2$, or $Al_2O_3/SiO_2$.

21 Claims, No Drawings

PROCESS FOR THE PRODUCTION OF SPERICAL SHAPED BODIES BASED ON Al₂O₃ AND OPTIONALLY SiO₂

BACKGROUND OF THE INVENTION

1. Field of the Invention

The invention concerns a process for the preparation of shaped bodies, particularly, spherical shaped bodies containing aluminum and/or silicon oxide or hydroxide, respectively, as well as the applications of such shaped bodies as catalysts and catalyst supports.

2. Background of the Prior Art

Adsorbtion means, catalysts and catalyst supports are used mainly in the fabricated form. Spherical shapes have numerous advantages compared with other configurations, such as for example, uniform packing, low resistance to flow, easy feeding, high apparent density, good abrasion resistance, high bursting strength, and the like.

Processes for the preparation of spherical bodies based on $Al_2O_3$ and/or $SiO_2$ are known.

Thus, for example, unstable or stable $Al_2O_3$ or $SiO_2$ sols may be added dropwise by the sol-gel method into a molding oil or mixtures of oxide, hardening agents, and a liquid may be added dropwise into a coagulating solution and subsequently processed into oxide-containing spheres.

These processes, however, have disadvantages such as, for example, the additional use of expensive $Al_2O_3$ sols, aluminum salts and of special chemicals, such as a gelling agent, molding oils or coagulating solutions; additional processing stages, such as aging or washing and/or limited grain sizes.

Based on hydroxides or oxyhydrates, respectively, of aluminum, agglomerating processes are known, wherein initially aluminum oxide or hydroxide is dehydrated and ground. The powder obtained in this manner is granulated with the addition of a liquid and, after aging, dried and tempered.

The necessary preparation of the granulating powder together with the aging of the green pellets is, however, costly and energy intensive. Furthermore, granulation by means of alternating wetting and powdering yields products with an undesirable shell structure and reduced strength.

Agglomerating processes effected without dehydration and aging, are forced to granulate the ground powder with the addition of acid and aluminum salts. This mode of processing requires expensive intial products and the use of an acid resistant apparatus.

From West German Offenlegungsschrift No. 26 15 868, a process for the preparation of spherical alumina particles is known, which is characterized by the following process steps:

(a) preparation of a mixture of alumina, the aluminum salt of a strong acid, a surface active agent insoluble in water and water, (b) agitation of the mixture to attain a minimum viscosity, followed by extrusion, (c) division of the extrusion in a rotating drum and shaping of the pellets, and (d) the drying and calcining of the spherical product.

Aside from the use of a costly aluminum salt, the application of a surface active agent is absolutely necessary. Furthermore, the process is restricted to the preparation of shaped bodies containing $Al_2O_3$ and is limited with respect to the grain size spectrum of the resulting spherical bodies. The process also yields products that exhibit unsatisfactory strength parameters.

SUMMARY OF THE INVENTION

It is an object of the invention to provide a new process for the preparation of spherical, oxide-containing shaped bodies on an $Al_2O_3$ and optionally $SiO_2$ basis, whereby the above-described disadvantages of the state-of-the-art are avoided. In particular, the initial material used shall be inexpensive and readily available or produceable, the products of the method shall be mechanically stable and have good porosities.

The process according to the invention comprises:

(a) preparing a plastic mixture of a powdery, predominantly dry component (K1) and a paste-like component (K2) containing predominantly water, possibly with the addition of more water and/or further supplements, wherein the mixture contains a material selected from the group consisting of aluminum oxide, aluminum hydroxide, silicon oxide or silicon hydroxide, and mixtures thereof, (b) continuously extruding the mixture and dividing the extruded product into cut sections;

(c) molding the cut sections of the extruded product into essentially spherical shaped bodies, and (d) drying the resulting spherical product and optionally tempering the spherical product.

Surprisingly, this process is capable of producing smooth pellets with a narrow grain size spectrum, good mechanical strength and good porosity.

In the preparation of shaped bodies on the basis of $Al_2O_3$, the predominantly dry component (K1) of hydroxides, oxyhydrates, transition oxides or oxides of aluminum, the characteristics and differences thereof are described in Ullmann, 4th Edition, Vol. 7, pp 294—300 in more detail. The solids contents of the powdery substances are between 65 and 100% by weight, while the water content of each powder is singularly determined by the existing chemical structure.

As the paste-like component (K2) containing predominantly water, aluminum oxide/hydroxide gels or sols, respectively, with a solids content of 10-50, preferably, 15-40% by weight, are used. These initial products are ready, commercially available, but in a variant of the process may also be easily prepared.

To prepare the paste-like $Al_2O_3$ gel, pseudobohmite (alpha-monohydrate) is treated for 0.75-2.5, preferably 1-2 hours, in a kneader, in the presence of acid peptizing agents which induce swelling. Preferred for this purpose are inorganic or organic acids that are volatile or dissociating at the drying or tempering temperatures, such as, for example, hydrochloric, nitric, formic or acetic acid. The mixture to be kneaded is within the following range of composition:

| | |
|---|---|
| $Al_2O_3$ | 10-50% by weight |
| | preferably 15-40% by weight |
| $H_2O$ | 50-90% by weight |
| | preferably 60-80% by weight |
| acid (calculated as anhydrous, 100% acid) | 0.1-20% by weight |
| | preferably 0.5-15% by weight |

Components K1 and K2 are intermixed, possibly with the addition of water and/or further components, in proportions so that the ratio A=K1 A:K2 A, wherein K1 A and K2 A, respectively, are the $Al_2O_3$ content (% by weight) of components 1 and 2, respectively, assumes values of 0.5-25, preferably 1-21.

To prepare shaped bodies on a $SiO_2$ basis, dried or tempered $SiO_2$ xerogels having a solids content of 75-100, preferably 88-99% by weight, are used. The K2 component consists of $SiO_2$ hydrolgels with a solids content of 8-15, preferably 9-12% by weight.

The K1 and K2 components are intermixed, with the possible addition of water and/or further components, in proportions so that the ratio S=K1 S:K2 S, wherein K1 S and K2 S, respectively, represent the $SiO_2$ content (% by weight) of the components 1 and 2, respectively, assumes values of 0.1-6.0, preferably 0.15-6.0.

For the preparation of shaped bodies based on $Al_2O_3/SiO_2$, dried or tempered $Al_2O_3/SiO_2$ xerogels with a solids content of 75-100, preferably 88-99% by weight, are used as the component K1. As the component K2, $Al_2O_3/SiO_2$ hydrogels having a solids content of 8-15, preferably 9-12% by weight, are applied. The $Al_2O_3/SiO_2$ proportion of the two components may be, independently of each other, within a range of 1 to 0-0 to 1, preferably 3.5 to 1-0 to 1. In the case of a proportion of 0 to 1, a $SiO_2$ gel free of $Al_2O_3$ and, in the case of 1 to 0, an $Al_2O_3$ gel free of $SiO_2$, is present.

The K1 and K2 components are intermixed, possibly with the addition of water, in a ratio so that in the finished mixture to be extruded the ratio of AS=K1 AS:K2 AS, wherein K1 AS and K2 AS, respectively, represent the sums of the $Al_2O_3$ and $SiO_2$ content, respectively, assumes values of 0.05-6.0, preferably 0.1-5.0.

Both the Al components based on $Al_2O_3/SiO_2$ or $SiO_2$, and the corresponding K2 components are readily available commercially, or they may be easily prepared. The K1 components based on $Al_2O_3/SiO_2$ may include uniform substances such as, for example, aluminosilicates, or heterogeneous mixtures of powders based on $Al_2O_3$ and $SiO_2$.

To effect the process, the K1 and K2 components, possibly with the further addition of water and/or other additives, are intermixed homogeneously in a mixer apparatus.

As potential additives, the use of substances that are volatile or dissociating at elevated temperatures, i.e. during the drying or tempering of the shaped bodies, has been found appropriate. Examples of such additives applied in amounts of 0-50, preferably 0.1-35% by weight of the paste-like component K2, are starch, wood flour, dextrin, cellulose derivatives and the like.

Furthermore, in special alternative embodiments of the process, the addition of metal oxides, in particular, magnesium and/or zinc oxide, may be advantageous. These metal oxides are used in amounts of 0-30%, preferably 10-24% by weight of the powder component (K1). This addition is recommended for the preparation of shaped bodies based on $Al_2O_3/SiO_2$ or $SiO_2$.

It is further of advantage, especially when the extrusions are not passed in a continuous process directly into the subsequent stages of the process, to adjust the pH value of the paste-like component K2 to a value of $pH \geq 4$. Conveniently, this adjustment may be effected by means of an acid that is volatile or dissociating at drying or tempering temperatures.

The homogeneous mixture prepared in this manner and to be used in the extruder, is characterized by the following ratio of solids to water:

| | |
|---|---|
| (a) mixture based on $Al_2O_3$ | 0.25:1 to 5.0:1 |
| | preferably 0.5:1 to 3.0:1 |
| (b) mixture based on $SiO_2$ or $Al_2O_3/SiO_2$ | 0.05:1 to 1.0:1 |
| | preferably 0.1:1 to 0.8:1 |

In the process according to the invention, the finished, plastic mixture is extruded in a conventional extruder through a die plate equipped with one or a plurality of bore holes. The cross section of the bore is preferably circular; its diameter is variable within broad limits and is determined solely by the diameter desired of the shaped bodies prepared by the process.

The comminution of the extrusion by the well known, conventional methods is effected so that cut lengths with a ratio of length to diameter of approximately 1:1 are obtained.

The cut lengths of the extrusion may be dried and tempered as such, but it is a particular advantage of the process of the invention that the plastic cut lengths of the extrusion may be formed particularly easily into essentially spherical shaped bodies, which by virtue of the above-described advantages of their configuration are generally preferred at the present time.

For this purpose, the cut lengths may be rounded off by conventional methods, i.e. in rotating drums, on rotating disks and the like. Particularly strong spherical shaped bodies are obtained by exposing the cut lengths in a known manner in addition to a rolling motion simultaneously to centrifugal acceleration. This is possible by placing the cut lengths in a preferably tubular or cup shaped rounding apparatus, wherein each point of the cross section performs a circular or approximately circular motion. In the simplest case, this consists of a tubular or cup-shaped container moving eccentrically around an imaginary axis, and at least partially hindered in its own rotating motion around the symmetry axis perpendicular to the plane of rotation. Containers suitable for continuous operation either are provided with appropriate features, such as for example, guide grooves to guide the cut lengths to be rounded, or when such installations are absent, are conically narrowed or opened in the outlet direction.

In a preferred embodiment of the invention, the cut lengths are continuously passed into the rounding vessel. Their retention time in the apparatus, together with the magnitude of the centrifugal acceleration, may be regulated as needed by means of the suitable selection of the velocity/eccentricity of the motion, together with size and height of the vessel.

Following their passage through the rounding stage, the shaped bodies are transported to a drying and possibly a tempering stage.

The advantages of the process according to the invention compared with the state-of-the-art are as follows:

(a) spherical shaped bodies of a homogeneous structure, high fracture strength and good porosity are produced;

(b) use of high priced, low percentage, liquid $Al_2O_3$ sol is eliminated and an inexpensive, high percentage, paste-like aluminum oxide/hydroxide gel or sol is applied;

(c) costly or special chemicals to be applied in large amounts, such as gelling agents, molding oils, coagulating solutions, aluminum salts, surface active agents, are eliminated;

(d) the conventional aging and washing processes are eliminated, and (e) the grain spectrum is narrow, the average grain diameter is variable within wide limits.

The following examples are intended to explain, but not to limit the process according to the invention.

EXAMPLES

The following abbreviations shall be used hereinafter:
PM = pore forming agent,
A = ratio of the $Al_2O_3$ contents in the K1 and K2 components,
S = ratio of the $SiO_2$ contents in the K1 and K2 components,
AS = ratio of the ($Al_2O_3 + SiO_2$) contents in the K1 and K2 components,
FS = the ratio of solids to water in the total initial mixture,
VO = ratio of $Al_2O_3$ to $SiO_2$,
B = bursting pressure (dimension: kg; measured by means of a bursting pressure instrument of the ZWICK Company; average value of 15 measurements),
O = surface (dimension: $m^2/g$, measured by the HAUL/DUMBGEN method),
PV = pore volume (dimension: ml/g; calculated from the true and apparent density),
D = diameter (mm),
Ty = tylose,
HM = wood flour.

Experiments 1-37

In these experiments, spherical shaped bodies are prepared based on the following oxides:
Experiments 1–16: $Al_2O_3$ basis
Experiments 17–19: $SiO_2$ basis
Experiments 20–29: $Al_2O_3/SiO_2$ basis
Experiment 30: $SiO_2$ basis with oxide addition
Experiments 31–37: $Al_2O_3/SiO_2$ basis with oxide addition.

The K1 and K2 components in the powder and paste form and specified in Tables 1 and 3 respectively, were mixed under the conditions given in Tables 2, 4 and 5 (in all of the experiments 100 g component K2 each) and optionally together with the additives equally listed, to a homogeneous plastic mass during a few minutes in a plough share mixer, extruded cold in a pilot-extruder through a die plate with a bore of circular cross section and divided into cut lengths, having a diameter/length ratio of approximately 1. The cut lengths of the extrusion were transported continuously onto the bottom of the rounding vessel, wherein they were rounded off during an average retention time between 2 and 40 seconds. The continuously discharged spherical shaped bodies were subsequently dried for 10 hours at 120° C. and tempered for 3 hours at 600° C.; they exhibited the properties listed in the tables.

TABLE I

| Powder Component K1 and Paste Component K2 Based on $Al_2O_3$ | | | |
|---|---|---|---|
| | | Composition | |
| | Type | $Al_2O_3$ | $H_2O$ |
| K1 Components | | | |
| alpha trihydrate | K1-10 | 65 | 35 |
| chi transition oxide | K1-11 | 99 | 1 |
| kappa transition oxide | K1-12 | 99.7 | 0.3 |
| alpha monohydrate (boehmite) | K1-13 | 70 | 30 |
| gamma transition oxide | K1-14 | 99 | 1 |
| delta transition oxide | K1-15 | 99.8 | 0.2 |
| theta transition oxide | K1-16 | 99.9 | 0.1 |
| alpha aluminum oxide | K1-17 | 100 | 0 |
| beta trihydrate (bayerite) | K1-18 | 65 | 35 |
| eta transition oxide | K1-19 | 98 | 2 |
| K2 components* | | | |
| DH Sol 40 | K2-10 | 31 | 69 |
| DH Sol 20 | K2-11 | 15.5 | 84.5 |

*Manufacturer: Giulini Co.

TABLE 2

| Spherical Shaped Bodies Based on $Al_2O_3$ | | | | | | | | | | | |
|---|---|---|---|---|---|---|---|---|---|---|---|
| Test | Components K1 | | PM | | | | | Parameters of Finished Spherical Shaped Bodies | | | |
| Experiment | Type | Weight | Type | TY | $H_2O$ | | | | | | |
| Number | K1 | (g) | K2 | (g) | (g) | A | FS | B | O | PV | D |
| 1 | 10 | 235.3 | 10 | 0 | 47.1 | 4.94 | 0.93 | 9.0 | 31 | 0.21 | 6.3 |
| 2 | 10 | 223.5 | 10 | 47.1 | 47.1 | 4.70 | 0.73 | 10.1 | 33 | 0.51 | 3.2 |
| 3 | 11 | 74.1 | 10 | 0.2 | 2.1 | 2.36 | 1.45 | 12.0 | 196 | 0.35 | 3.3 |
| 4 | 12 | 166.7 | 10 | 2.8 | 0.0 | 5.36 | 2.72 | 10.9 | 79 | 0.28 | 3.5 |
| 5 | 13 | 50.0 | 10 | 0.6 | 6.3 | 1.21 | 0.78 | 8.9 | 202 | 0.46 | 1.6 |
| 6 | 13 | 880.0 | 10 | 2.4 | 324.0 | 19.90 | 0.98 | 7.5 | 181 | 0.61 | 1.0 |
| 7 | 14 | 74.1 | 10 | 0.2 | 2.1 | 2.36 | 1.45 | 16.1 | 166 | 0.50 | 3.4 |
| 8 | 15 | 160.0 | 10 | 4.0 | 0.0 | 5.17 | 2.60 | 17.2 | 86 | 0.33 | 9.9 |
| 9 | 16 | 150.0 | 10 | 0.3 | 0.0 | 4.83 | 2.61 | 15.7 | 60 | 0.23 | 2.1 |
| 10 | 17 | 146.0 | 10 | 2.4 | 0.0 | 4.71 | 2.48 | 13.9 | 37 | 0.20 | 2.6 |
| 11 | 17 | 166.7 | 10 | 2.8 | 0.0 | 5.38 | 2.76 | 18.6 | 38 | 0.19 | 3.2 |
| 12 | 18 | 235.3 | 10 | 0 | 47.1 | 4.94 | 0.93 | 8.9 | 52 | 0.13 | 3.2 |
| 13 | 19 | 74.1 | 10 | 0.2 | 2.1 | 2.34 | 1.43 | 12.1 | 320 | 0.31 | 3.2 |
| 14 | 13 | 23.5 | | | | | | | | | |
| | 10 | 164.7 | 10 | 0 | 70.6 | 4.01 | 0.76 | 9.7 | 52 | 0.34 | 3.2 |
| 15 | 13 | 14.9 | | | | | | | | | |
| | 10 | 74.6 | 10 | 0 | 74.6 | 1.91 | 0.52 | 8.7 | 73 | 0.40 | 1.6 |
| 16 | 13 | 90.0 | 11 | 0 | 0.0 | 4.10 | 0.70 | 8.1 | 152 | 0.47 | 1.3 |

TABLE 3

Powder Components K1 and Paste Components K2 Based on SiO₂ or Al₂O₃/SiO₂

| Composition of the Dry Solids (% by Weight) | | | | K1 Component | | | K2 Component | | |
|---|---|---|---|---|---|---|---|---|---|
| Al₂O₃ | SiO₂ | Na₂O | VO | Type | Solids (% wgt.) | H₂O (% wgt.) | Type | Solids (% wgt.) | H₂O (% wgt.) |
| 0 | 99.84 | 0.16 | 0 | K1-20 | 97.51 | 2.49 | K2-20 | 12.00 | 88.00 |
| 2.57 | 97.38 | 0.05 | 0.026 | K1-21 | 94.00 | 6.00 | K2-21 | 9.00 | 91.00 |
| 10.91 | 88.89 | 0.20 | 0.123 | K1-22 | 98.97 | 1.03 | K2-22 | 10.96 | 89.04 |
| 51.88 | 47.97 | 0.15 | 1.082 | K1-23 | 99.00 | 1.00 | K2-23 | 10.01 | 89.99 |
| 75.13 | 24.56 | 0.31 | 3.059 | K1-24 | 88.00 | 12.00 | K2-24 | 9.71 | 90.29 |

TABLE 4

Spherical Shaped Bodies Based on SiO₂ or A₃/SiO₂

| Experiment Number | K1 Component Type K1 | K1 Component Mass (g) Weight | Type K2 | S | AS | FS | B | O | PV | D |
|---|---|---|---|---|---|---|---|---|---|---|
| 17 | 20 | 57.0 | 20 | 4.63 | | 0.755 | 1.4 | 283 | 0.91 | 2.9 |
| 18 | 20 | 23.6 | 20 | 1.92 | | 0.395 | 0.9 | 276 | 0.90 | 3.2 |
| 19 | 20 | 2.1 | 20 | 0.17 | | 0.159 | 1.3 | 264 | 0.90 | 3.1 |
| 20 | 21 | 48.0 | 21 | | 5.01 | 0.577 | 1.0 | 560 | 0.28 | 3.3 |
| 21 | 22 | 37.5 | 22 | | 3.38 | 0.538 | 1.3 | 273 | 0.35 | 2.5 |
| 22 | 23 | 37.5 | 23 | | 3.71 | 0.522 | 1.7 | 113 | 0.41 | 2.4 |
| 23 | 24 | 28.0 | 24 | | 2.54 | 0.367 | 1.6 | 276 | 0.40 | 2.1 |
| 24 | 20 | 12.8 | 21 | | 1.39 | 0.235 | 1.1 | 390 | 0.60 | 3.0 |
| 25 | 20 | 6.6 | 22 | | 0.59 | 0.195 | 1.0 | 264 | 0.55 | 1.5 |
| 26 | 20 | 5.2 | 23 | | 0.51 | 0.167 | 0.8 | 173 | 0.56 | 1.0 |
| 27 | 20 | 1.1 | 24 | | 0.11 | 0.119 | 1.2 | 270 | 0.44 | 3.3 |
| 28ˣ | 21 | 12.8 | 20 | | 1.00 | 0.265 | 1.1 | 420 | 0.60 | 3.2 |
| 29ˣ | 23 | 12.8 | 20 | | 1.06 | 0.280 | 1.5 | 189 | 0.65 | 3.3 |

ˣIn Experiment 28, 2.0 g, in Experiment 29, 0.1 g of a pore forming agent were added (TY)

TABLE 5

Spherical Shaped Bodies Based on SiO₂ or Al₂O₃/SiO₂ with an Oxide Addition

| Experiment Number | K1 Component Type K1 | K1 Component Mass Weight (g) | Type K2- | Oxide ZuO (g) | Oxide MgO (g) | PM TY (g) | PM HM (g) | S | AS | FS | B | O | PV | D |
|---|---|---|---|---|---|---|---|---|---|---|---|---|---|---|
| 30 | 20 | 3.3 | 20 | 0.5 | 0.2 | 1.3 | 4.3 | 0.267 | | 0.170 | 5.1 | 253 | 0.91 | 3.2 |
| 31ˣ | 21 | 3.3 | 21 | 0.3 | 0.3 | 1.3 | 0 | | 0.344 | 0.137 | 5.3 | 551 | 0.36 | 3.0 |
| 32 | 22 | 3.3 | 22 | 0.7 | 0 | 1.3 | 4.3 | | 0.300 | 0.159 | 6.5 | 237 | 0.36 | 3.1 |
| 33 | 23 | 5.0 | 23 | 0.5 | 0.5 | 1.8 | 6.4 | | 0.490 | 0.162 | 4.3 | 117 | 0.40 | 3.2 |
| 34 | 24 | 10.0 | 24 | 2.0 | 0 | 3.6 | 12.8 | | 0.907 | 0.190 | 6.1 | 285 | 0.47 | 3.2 |
| 35 | 21 | 11.7 | 20 | 0 | 2.3 | 4.2 | 15.0 | | 0.917 | 0.234 | 4.9 | 446 | 0.62 | 3.1 |
| 36 | 22 | 3.0 | 20 | 0.7 | 0 | 0.2 | 0 | | 0.250 | 0.178 | 4.0 | 237 | 0.79 | 2.9 |
| 37 | 23 | 5.0 | 20 | 0.5 | 0.2 | 0 | 0 | | 0.408 | 0.200 | 4.6 | 216 | 0.75 | 3.0 |

ˣIn Experiment 30, 0.3g H₂O was added

As shaping cup, 65 cm high steel pot with an internal diameter of 28 cm and a 6 cm higher collar at its upper end was used. The pot, prevented from rotating on its own, was equipped to be placed into an eccentric, essentially circular motion parallel to its bottom plane. For this purpose, the vessel was secured with the center of its bottom surface to an arm driven by the shaft of a motor, wherein the distance of the symmetry axis (imaginary) passing through the center of the bottom area of the cup to the (imaginary) axis passing through the motor shaft was variable and amounted to 6–10 cm during the experiments.

By means of a variable speed drive, the rotating velocity of the motor was continuously controllable within a range of 208–340 rpm; in the experiments, speeds of 310–330 rpm were used.

To guide the cut lengths to be rounded, the rounding vessel was provided on the inside of the wall in a helical arrangement with guiding grooves having hemispherical cross section with diameters of 2.5 cm and a total length of 15 m. A total of 18 turns were installed from the bottom of the vessel to its outlet.

As mentioned hereinabove, the cut lengths are fed into the rounding vessel directly from about, i.e., in a free fall. After passing through the rounding vessel, the pieces are guided through an outlet orifice located in the collar of the vessel into a receiving funnel and from there into a storage container.

Experiments 38–41

In these experiments, spherical shaped bodies based on Al₂O₃ were prepared; the paste component K2 was prepared within the experiments themselves.

For this purpose, in accordance with the data in Table 6, Type K1-13 aluminum oxide and acid as the peptizing agent were kneaded for 1–2 hours in a plough share mixer. In some of the experiments, the acid was added, as indicated, in two steps; however, this resulted in no difference as compared with the single step operation. The pH value of the finished gel was around pH=4, these gels are stable in storage for long periods of time.

The shaped bodies (see conditions in Table 7; 100 g gel each) were prepared essentially as in Experiments 1–37. Only the rounding vessel was of a different configuration: a cut shaped vessel conically broadening in the upward direction, 75 cm high with a 6 cm high collar, a lower diameter of 30 cm and an upper diameter of 35 cm, without guided grooves, i.e. with smooth walls, was used in an otherwise unchanged arrangement. The properties of the resulting bodies are seen in Table 7.

TABLE 6

Preparation of an $Al_2O_3$ Gel (Component K2)

| Experiment Number | $Al_2O_3$ (kg) | Acid Type | Acid Conc. (wgt. %) | Weight (kg) | Kneading Time (hours) | $Al_2O_3$ | Acid (100% ig) | $H_2O$ | Type |
|---|---|---|---|---|---|---|---|---|---|
| I | 2.5 | $HNO_3$ | 1.0 | 4.5 | 1.0 | 26.79 | 0.64 | 72.57 | K2-30 |
| II | 3.0 | $HNO_3$ | 2.1 | 3.0 | 0.5 | 34.00 | 1.13 | 64.87 | K2-31 |
|  |  | $HNO_3$ | 2.0 | 0.6 | 1.0 |  |  |  |  |
| III | 2.5 | $HNO_3$ | 1.0 | 4.5 | 0.5 | 26.51 | 1.31 | 72.18 | K2-32 |
|  |  | $HNO_3$ | 65.0 | 0.1 | 1.0 |  |  |  |  |
| IV | 2.0 | $HNO_3$ | 2.6 | 3.6 | 1.5 | 26.79 | 1.68 | 71.53 | K2-33 |
| V | 2.0 | $HNO_3$ | 2.1 | 2.0 | 0.5 | 26.68 | 1.71 | 71.61 | K2-34 |
|  |  | $HNO_3$ | 5.2 | 0.6 | 1.0 |  |  |  |  |
| VI | 2.7 | $HNO_3$ | 2.7 | 2.4 | 0.5 | 18.72 | 3.44 | 77.84 | K2-35 |
|  |  | $HNO_3$ | 5.2 | 0.6 | 1.0 |  |  |  |  |
| VII | 2.5 | HCl | 1.0 | 4.5 | 0.5 | 26.36 | 1.65 | 71.99 | K2-36 |
|  |  | HCl | 65.0 | 0.1 | 1.0 |  |  |  |  |
| VIII | 2.5 | $CH_3COOH$ | 18.0 | 4.5 | 2.0 | 2.79 | 11.57 | 61.64 | K2-37 |
| IX | 2.5 | HCOOH | 1.5 | 4.5 | 2.0 | 26.79 | 0.96 | 72.25 | K2-38 |
| X | 2.5 | HCOOH | 2.5 | 4.5 | 1.5 | 26.79 | 1.61 | 71.60 | K2-39 |
| XI | 2.5 | HCOOH | 5.0 | 4.5 | 1.5 | 26.79 | 3.21 | 70.00 | K2-40 |

TABLE 7

Spherical Shaped Bodies Based on $Al_2O_3$

| Experiment Number | Component K1 Type K1 | Component K1 Mass wgt. | Type K2- | PM TY (g) | $H_2O$ (g) | A | FS | B | O | PV | D |
|---|---|---|---|---|---|---|---|---|---|---|---|
| 38 | 11 | 89.3 | 37 | 0.2 | 2.2 | 3.30 | 1.506 | 11.0 | 184 | 0.56 | 3.4 |
| 39 | 14 | 100.0 | 33 | 0.2 | 1.4 | 3.70 | 1.660 | 8.7 | 170 | 0.54 | 3.4 |
| 40 | 13 | 50.0 | 38 | 0.0 | 0.0 | 1.31 | 0.701 | 16.8 | 163 | 0.66 | 3.0 |
| 41 | 10 | 54.1 | 35 | 0.2 | 1.5 | 1.88 | 0.529 | 6.9 | 82 | 0.51 | 3.1 |

What is claimed is:

1. A process for the preparation of shaped bodies comprising:
    (a) preparing a plastic mixture by mixing a predominantly dry component (K1) in powder form of a material selected from the group consisting of aluminum oxides, aluminum hydroxides, and mixtures thereof and a paste component (K2) comprising water in the form of a material selected from the group consisting of gels and sols of aluminum oxides, aluminum hydroxides and mixtures thereof;
    (b) continuously extruding said plastic mixture into extrudates;
    (c) continuously cutting said extrudates into cut lengths;
    (d) shaping said cut lengths into spherical shaped bodies and
    (e) drying said spherical shaped bodies.

2. The process of claim 1 further comprising the step of tempering said spherical shaped bodies.

3. The process of claim 1 for preparing shaped bodies based on $Al_2O_3$ wherein said powder component (K1) has a solids content of 65–100% by weight based on $Al_2O_3$, said powder component selected from the group consisting of oxides, hydroxides, oxyhydrates and transition oxides of aluminum and wherein said paste component (K2) has a solids content of 10–50% by weight and is selected from the group consisting of gels and sols of aluminum oxides and hydroxides.

4. The process of claim 3 wherein said solids content of said paste component (K2) is 15–40% by weight.

5. The process of claim 3 wherein said powder component (K1) and said paste component (K2) are mixed together in a proportion so that their respective $Al_2O_3$ contents in the finished mixture form a ratio of 0.5:1 to 25:1.

6. The process of claim 5 wherein said ratio is 1:1 to 21:1.

7. The process of claim 1 wherein the powdered component (K1) contains from 0 to 30% by weight of a compound selected from the group consisting of magnesium oxide, zinc oxide and mixtures thereof.

8. The process of claim 7 wherein said powdered component (K1) contains from 10–24% by weight of said compound selected from the group consisting of magnesium oxide, zinc oxide and mixtures thereof.

9. The process of claim 1 wherein said paste component (K2) contains from 0 to 50% by weight of a substance selected from the group consisting of volatile substances and dissociable substances at elevated temperatures.

10. The process of claim 9 wherein said volatile or dissociable substance is present in an amount from 0.1–35% by weight.

11. The process of claim 1 wherein said plastic mixture is adjusted to a pH of at least 4.

12. The process of claim 1 wherein said plastic mixture for extrusion contains a solids to water ratio of 0.25:1 to 5.0:1 for the preparation of particles based on $Al_2O_3$ and 0.05:1 to 1.0:1 for particles based on $SiO_2$ or $Al_2O_3/SiO_2$.

13. The process of claim 12 wherein said ratio for the preparation of particles based on $Al_2O_3$ is 0.5:1 to 3.0:1 and said ratio for preparation of particles based on $SiO_2$ or $Al_2O_3/SiO_2$ is 0.1:1 to 0.8:1.

14. The process of claim 1 wherein said cut lengths have a ratio of length to diameter of approximately 1:1.

15. The process of claim 1 wherein said paste component (K2) is obtained by kneading the α-monohydrate of an aluminum oxide gel with acid peptizing agents.

16. The process of claim 15 wherein the aluminum oxide gel comprises 10 to 50% by weight $Al_2O_3$, 50–90% by weight water and 0.1–20% acid based on the total weight of said aluminum oxide gel.

17. The process of claim 16 wherein said aluminum oxide gel comprises 15–40% by weight $Al_2O_3$, 60–80% by weight water and 0.5–15% by weight acid.

18. The process of claim 15 wherein said peptizing agent is selected from the group consisting of organic and inorganic acids volatile or readily dissociable at elevated temperatures.

19. The process of claim 1 wherein said shaping step comprises exposing said cut lengths to centrifugal force in a tubular cap-shaped rounding apparatus.

20. The process for the preparation of catalyst and catalyst supports comprising preparing shaped bodies according to the process of claim 1 and finishing said shaped bodies as catalyst and catalyst supports.

21. A catalyst and catalyst support produced by the process of claim 1.

* * * * *